United States Patent
Minagawa et al.

(10) Patent No.: US 11,168,465 B2
(45) Date of Patent: Nov. 9, 2021

(54) WORK VEHICLE, DISPLAY DEVICE, AND FAULT DETERMINATION METHOD

(71) Applicant: KOMATSU LTD., Tokyo (JP)

(72) Inventors: Masanori Minagawa, Tokyo (JP); Jun Morinaga, Tokyo (JP); Yasuhiro Ohyama, Tokyo (JP); Qi Ding, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 16/615,921

(22) PCT Filed: Sep. 27, 2018

(86) PCT No.: PCT/JP2018/036110
§ 371 (c)(1),
(2) Date: Nov. 22, 2019

(87) PCT Pub. No.: WO2019/065907
PCT Pub. Date: Apr. 4, 2019

(65) Prior Publication Data
US 2020/0208381 A1 Jul. 2, 2020

(30) Foreign Application Priority Data
Sep. 29, 2017 (JP) .............................. JP2017-191293

(51) Int. Cl.
| E02F 9/26 | (2006.01) |
| B60R 1/00 | (2006.01) |
| E02F 3/43 | (2006.01) |
| E02F 9/20 | (2006.01) |
| H04N 7/18 | (2006.01) |

(Continued)

(52) U.S. Cl.
CPC .................. *E02F 9/26* (2013.01); *B60R 1/00* (2013.01); *E02F 3/435* (2013.01); *E02F 9/205* (2013.01); *H04N 7/183* (2013.01); *H04N 17/004* (2013.01); *B60Q 1/50* (2013.01); *E02F 3/308* (2013.01)

(58) Field of Classification Search
CPC .. E02F 9/26; E02F 3/435; E02F 9/205; B60R 1/00; H04N 7/183
See application file for complete search history.

(56) References Cited

U.S. PATENT DOCUMENTS 10,240,323 B2 * 3/2019 Kurihara ................ G01S 13/931
2007/0164873 A1 7/2007 Yamada et al.
(Continued)

FOREIGN PATENT DOCUMENTS

| EP | 0976879 | 2/2000 |
| JP | U-A-06-059399 | 8/1994 |

(Continued)

OTHER PUBLICATIONS

PCT International Search Report and Written Opinion in International Appln. No. PCT/JP2018/036110, dated Dec. 18, 2018, 6 pages (with English Translation).

*Primary Examiner* — Rowina J Cattungal
(74) *Attorney, Agent, or Firm* — Fish & Richardson P.C.

(57) ABSTRACT

A work vehicle includes a changing object that is an object in which a known change in an external appearance occurs for each fixed time, an imaging device that images an area where the changing object appears, and a transmitting device that transmits an image captured by the imaging device.

20 Claims, 5 Drawing Sheets

(51) Int. Cl.
  *H04N 17/00*  (2006.01)
  *B60Q 1/50*   (2006.01)
  *E02F 3/30*   (2006.01)

(56) References Cited

U.S. PATENT DOCUMENTS

| | | | | |
|---|---|---|---|---|
| 2015/0081165 | A1* | 3/2015 | Yamashita | F02D 29/02 |
| | | | | 701/34.4 |
| 2017/0335548 | A1* | 11/2017 | Noda | G05D 1/0038 |
| 2018/0019788 | A1* | 1/2018 | Wadell | B66F 9/0755 |
| 2018/0143625 | A1* | 5/2018 | Nelson | G05B 19/042 |
| 2018/0171594 | A1* | 6/2018 | Tsuji | H04N 5/23238 |
| 2019/0335079 | A1* | 10/2019 | Koizumi | H04N 5/35572 |

FOREIGN PATENT DOCUMENTS

| | | |
|---|---|---|
| JP | A-10-226488 | 8/1998 |
| JP | A-2008-111269 | 5/2008 |
| WO | WO 2012/061888 | 5/2012 |

\* cited by examiner

WORK VEHICLE, DISPLAY DEVICE, AND FAULT DETERMINATION METHOD

CROSS-REFERENCE TO RELATED APPLICATIONS

This application claims priority to International Application No. PCT/JP2018/036110 filed on Sep. 27, 2018, which claims priority to Japanese Patent Application No. 2017-191293, filed on Sep. 29, 2017, the contents of each are incorporated herein in their entirety.

TECHNICAL FIELD

The present invention relates to a display control device and a display control method which are for an image captured by a work machine.

BACKGROUND ART

A technique of remotely operating a work vehicle is known. In order to remotely operate the work vehicle, it is necessary that a state surrounding the work vehicle be recognizable from the outside. For this reason, the remotely operated work vehicle includes an imaging device that images the surrounding state and a communication device that transmits the captured image to the outside. Accordingly, an operator can perform operation while looking at the image transmitted from the work vehicle.

A technique of allowing an operator of a control room to easily perform appropriate control by a television camera imaging a rotating lamp is disclosed in Patent Document 1.

CITATION LIST

Patent Literature

[Patent Document 1] Japanese Unexamined Patent Application, First Publication No. H10-226488

DISCLOSURE OF INVENTION

Technical Problem

The operator recognizes a state of the work vehicle by looking at the image, and operates the work vehicle based on the state. For this reason, when a fault occurs in any one of the imaging device, a communication path, and a display device (image system), there is a possibility that productivity decreases.

An object of an aspect of the present invention is to provide a work vehicle, a display device, and a fault determination method which allow a remote operator to recognize the presence or absence of a fault in an image system.

Solution to Problem

According to a first aspect of the present invention, a work vehicle includes a work equipment, a changing object on which a known change in an external appearance occurs for each fixed time, an imaging device that images an area where at least a part of the work equipment and the changing object appear, and a transmitting device that transmits an image captured by the imaging device.

Advantageous Effects of Invention

According to the aspect, the work vehicle allows a remote operator to recognize the presence or absence of a fault in an image system.

BEST MODE FOR CARRYING OUT THE INVENTION

First Embodiment

<System>

Figure 1:
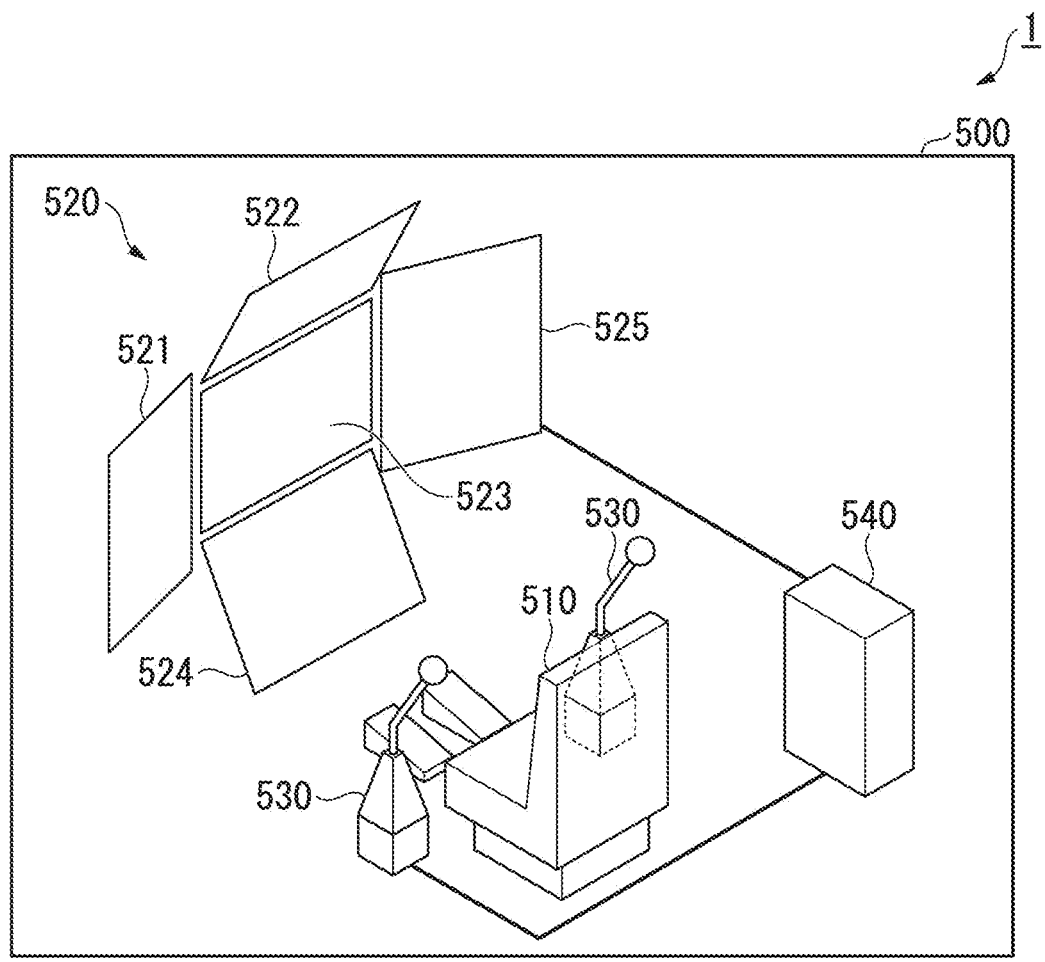
FIG. 1 is a schematic view illustrating a configuration of a remote operation system according to a first embodiment.
Figure 1:
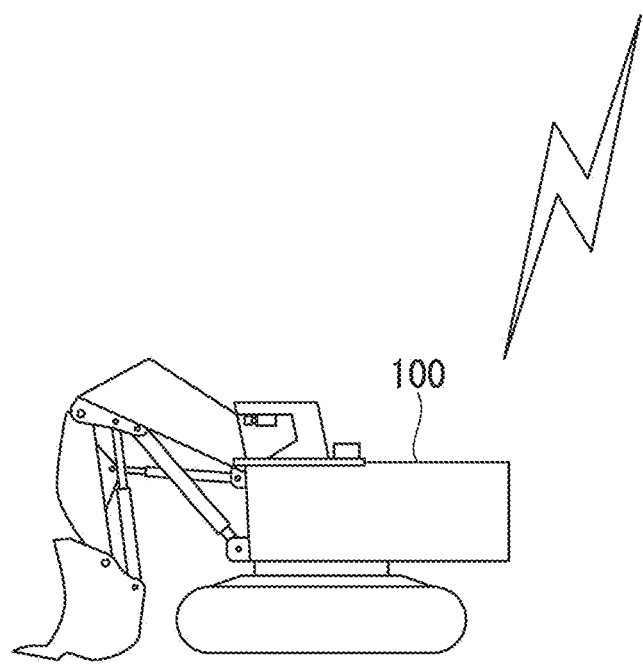

FIG. 1 is a schematic view illustrating a configuration of a remote operation system according to a first embodiment.

A remote operation system 1 includes a work vehicle 100 that is operated by remote operation and a remote operation room 500. The work vehicle 100 is provided in a work site (for example, a mine or a quarry). The remote operation room 500 is provided in a spot separated away from the work vehicle 100 (for example, in a town or in the work site). The work vehicle 100 and the remote operation room 500 are connected to each other via a network such as the Internet.

The remote operation system 1 is a system for operating the work vehicle 100 by using the remote operation room 500.

The work vehicle 100 operates in accordance with an operation signal received from the remote operation room 500.

The remote operation room 500 receives operation of the work vehicle 100 by operation of an operator and transmits an operation signal to the work vehicle 100.

<Work Vehicle>

Figure 2:
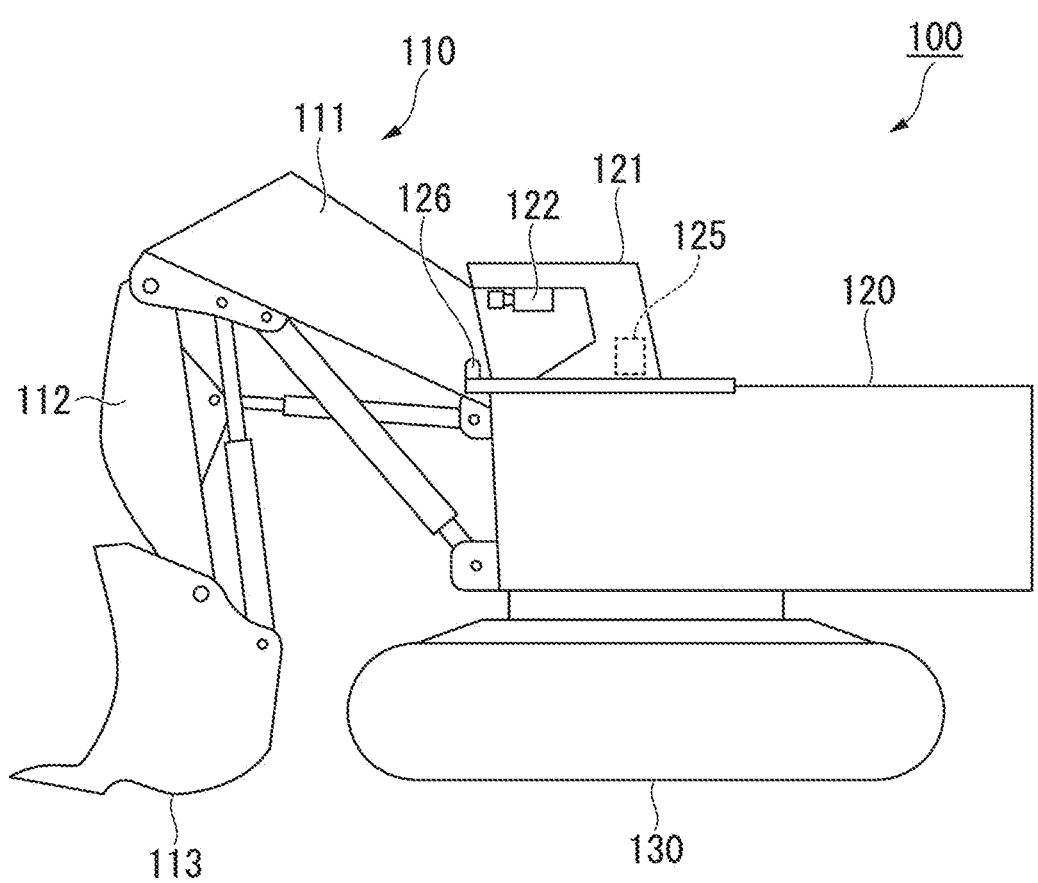
FIG. 2 is an external view of a work vehicle according to the first embodiment.

FIG. 2 is an external view of the work vehicle according to the first embodiment.

The work vehicle 100 according to the first embodiment is a hydraulic shovel. The work vehicle 100 according to another embodiment may be a work vehicle other than the hydraulic shovel, for example, a wheel loader or a bulldozer.

The work vehicle 100 includes a work equipment 110 that is operated by a hydraulic pressure, a swing body 120 that supports the work equipment 110, and a traveling body 130 that supports the swing body 120.

The work equipment 110 includes a boom 111, an arm 112, and a bucket 113.

A base end portion of the boom 111 is attached to the swing body 120 via a pin.

The arm 112 connects the boom 111 to the bucket 113. A base end portion of the arm 112 is attached to a tip portion of the boom 111 via a pin.

The bucket 113 includes a blade for digging up earth and a container for transporting the dug up earth. A base end portion of the bucket 113 is attached to a tip portion of the arm 112 via a pin.

The swing body 120 includes an operator cab 121.

In front of the operator cab 121, a mode lamp 126 is provided. The mode lamp 126 includes a plurality of lamps (for example, a light-emitting diode (LED)), and at least one of the plurality of lamps blinks according to an operation state of the work vehicle 100. A blinking pattern of each lamp is determined in advance. That is, the lamps are examples of a changing object in which a known change in an external appearance occurs for each fixed time.

The mode lamp 126 includes, for example, a first lamp which emits green light, a second lamp which emits yellow light, and a third lamp which emits red light, in order from the left toward an outer side of an operation seat, and may exhibit the following behavior. In a case where the work vehicle 100 is in a manned operation state, the first lamp blinks. In a case where the work vehicle 100 is in a remote operation state, the second lamp blinks. In a case where the work vehicle 100 is in an error state, the third lamp blinks. In a case where the work vehicle 100 is switched between manned operation and remote operation, all the lamps blink. In a case where the work vehicle 100 is under maintenance, the first lamp and the second lamp blink. The mode lamp 126 may be attached not only in front of the operation seat 510 but also in four corners of the swing body 120. In addition, each lamp may be vertically arranged.

Accordingly, a worker outside the work vehicle 100 can recognize an operation mode of the work vehicle 100. While the work vehicle 100 is being driven, at least one lamp of the mode lamp 126 blinks at all times regardless of the presence or absence of an operation signal. The lamps included in the mode lamp 126 may each be a rotating lamp that reflects, by a reflecting mirror rotating around a light source, light emitted by the light source.

Figure 3:
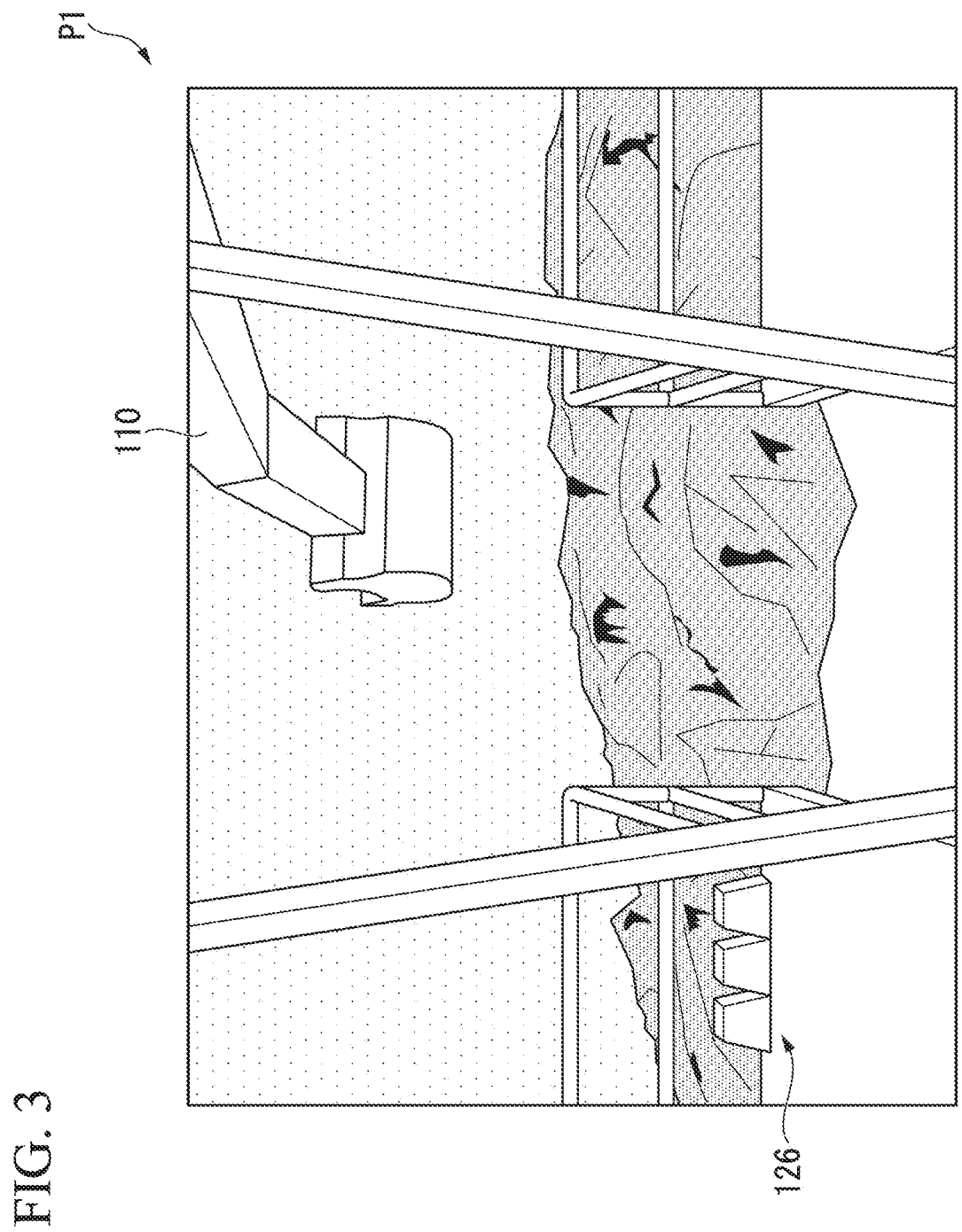
FIG. 3 is an example of an image captured by an imaging device of the work vehicle according to the first embodiment.

FIG. 3 is an example of an image captured by an imaging device of the work vehicle according to the first embodiment.

An imaging device 122 is provided in an upper portion of the operator cab 121. The imaging device 122 is provided on the upper front in the operator cab 121. The imaging device 122 captures an image (for example, a moving image) of the front of the operator cab 121 through a windshield in the front of the operator cab 121. An imaging device in which, for example, a charge-coupled device (CCD) sensor and a complementary metal-oxide semiconductor (CMOS) sensor are used, is given as an example of the imaging device 122. The imaging device 122 images an area where the work equipment 110, the mode lamp 126, and a work target in front of the operator cab 121 appear. That is, as shown in FIG. 3, the work equipment 110, the mode lamp 126, and a work target area in front of the operator cab 121 appear in an image P1 captured by the imaging device 122.

The work vehicle 100 includes the control device 125.

The control device 125 includes an image-encoding device (not shown), and encodes an image captured by the imaging device 122. The control device 125 transmits an encoded image to the remote operation room 500. The image-encoding device may be provided separately from the control device 125.

The control device 125 receives an operation signal from the remote operation room 500. The control device 125 drives the work equipment 110, the swing body 120, or the traveling body 130 in accordance with the received operation signal.

<Remote Operation Room>

The remote operation room 500 includes an operation seat 510, a display device 520, an operation device 530, and a control device 540.

The display device 520 is disposed in front of the operation seat 510. The display device 520 is positioned in front of the eyes of an operator when the operator has sat in the operation seat 510. The display device 520 is configured with a display 521, a display 522, a display 523, a display 524, and a display 525, which are arranged as shown in FIG. 1. In another embodiment, the number of displays configuring the display device 520 is not limited thereto. For example, the display device 520 may be configured with one display. In addition, the display device 520 may cause a projector to project an image onto a curved surface or a spherical surface.

The operation device 530 is disposed in the vicinity of the operation seat 510. The operation device 530 is positioned within an area where an operator can operate when the operator has sat in the operation seat 510. The operation device 530 includes, for example, an electric lever and an electric pedal.

Figure 4:
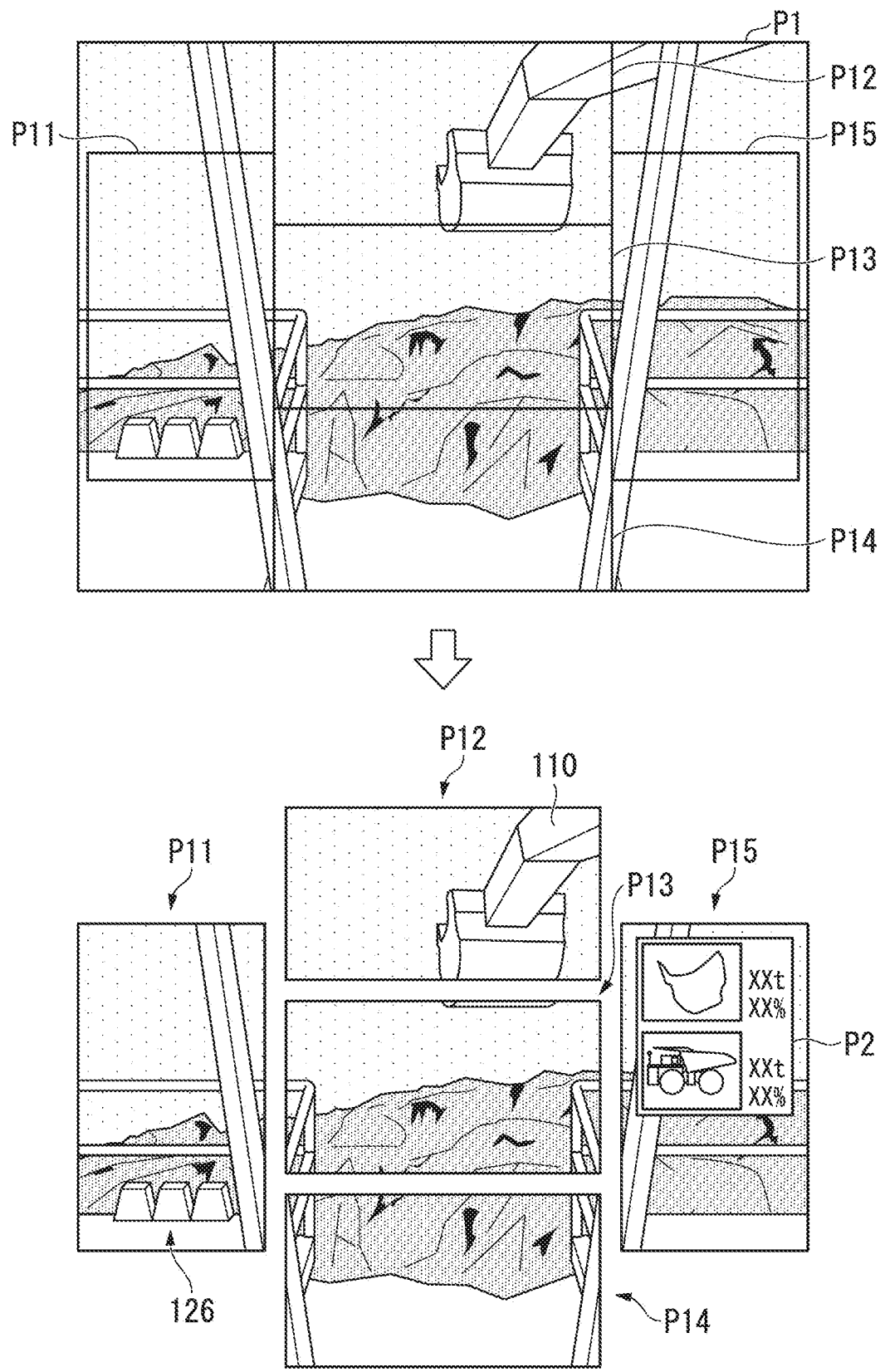
FIG. 4 is an example of an image displayed on a display device of a remote operation room according to the first embodiment.

FIG. 4 is an example of an image displayed on the display device of the remote operation room according to the first embodiment.

The control device 540 cuts out each of an image P11 for displaying onto the display 521, an image P12 for displaying onto the display 522, an image P13 for displaying onto the display 523, an image P14 for displaying onto the display 524, and an image P15 for displaying onto the display 525 from the processed image P1 captured by the imaging device 122 out of images received from the work vehicle 100. At this time, the control device 540 performs cutting-out so as to leave a portion where a part of the mode lamp 126 and a part of the work equipment 110 appear in at least one of the image P11 to the image P15. In the example shown in FIG. 4, the control device 540 performs cutting-out so as to leave a portion where the mode lamp 126 appears in the image P11.

The control device 540 causes the display 521 to display the image P11. The control device 540 causes the display 522 to display the image P12. The control device 540 causes the display 523 to display the image P13. The control device 540 causes the display 524 to display the image P14. The control device 540 causes the display 525 to display the image P15.

In addition, the control device 540 superimposes the image P2, which is an image captured by a back camera (not shown) or an image indicating car body information (such as an inclination state of a car body), onto any one of the image P11 to the image P15, and causes the superimposed image to be displayed onto a part of the display device 520. At this time, the control device 540 superimposes the image captured by the back camera (not shown) or the image indicating car body information onto a portion of the image captured by the imaging device 122, in which the mode lamp 126 does not appear. That is, an image of the mode lamp 126 is displayed on the display device 520 at all times. In the example shown in FIG. 4, the control device 540 superimposes the image P2 onto the image P15 and causes the display 525 to display the superimposed image.

An operator operates the operation device 530 while looking at the front view of the work vehicle 100 displayed on the display device 520. The control device 540 transmits an operation signal indicating operation of the operation device 530 to the work vehicle 100.

<Fault Determination Method>

Figure 5:
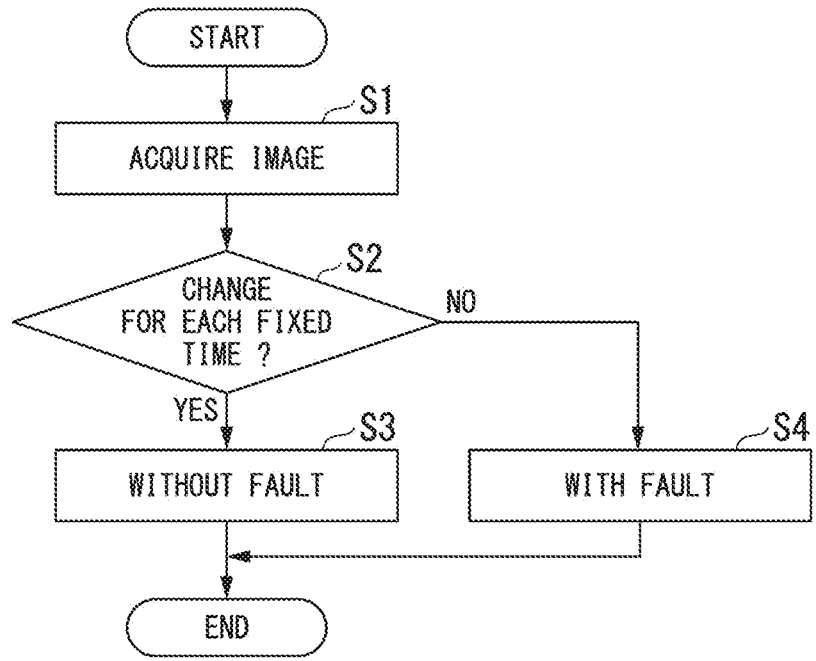
FIG. 5 is a flow chart showing a fault determination method of an image system according to the first embodiment.

FIG. 5 is a flow chart showing a fault determination method of an image system according to the first embodiment. The image system in the embodiment refers to a transmission path of an image including the imaging device 122, the control device 125, the control device 540, and the display device 520.

According to the configuration described above, the control device 540 of the remote operation room 500 acquires the images P11 to P15, in which the mode lamp 126 appears, from the control device 125 of the work vehicle 100 (Step S1), and causes the display device 520 to display the images P11 to P15. An operator looks at a portion of the image displayed on the display device 520, in which the mode lamp 126 is displayed, and determines whether or not the displayed image changes for each fixed time (Step S2). In a case where the displayed image changes for each fixed time (Step S2: YES), the operator determines that a fault in the image system has not occurred (Step S3). On the other hand, in a case where the displayed image does not change for each fixed time (Step S2: NO), the operator determines that a fault in the image system has occurred (Step S4).

<Action and Effect>

According to the above configuration, an image of the mode lamp 126 is displayed on the display device 520 at all times. An image captured by the imaging device 122 reaches the display device 520 via the image system. When a fault occurs in the image system, transmission of the image stops. Thus, there is a possibility that the image displayed on the display device 520 is not updated. For example, in a case where the imaging device 122 captures a moving image, the same frame image is continued to be displayed on the display device 520 while update is not performed. In addition, for example, in a case where the imaging device 122 continuously captures a stationary image, the same stationary image captured before fault occurrence is continued to be displayed on the display device 520 while update is not performed.

On the other hand, when the work equipment 110 is stopped, or also when a movement amount of the work equipment 110 is extremely small, it appears to an operator that an image displayed on the display device 520 is stopped.

At this time, by looking at a portion of the image displayed on the display device 520, in which the mode lamp 126 is displayed, the operator can determine whether the image seems to be stopped due to a fault in the image system or whether the image seems to be stopped since the work equipment 110 is stopped or the movement amount is extremely small. The operator can determine the presence or absence of a fault even when the work equipment 110 does not operate since an external appearance of the mode lamp 126 changes at least while an image is being transmitted or received, regardless of the presence or absence of operation of the operation device 530. That is, the work vehicle 100 according to the embodiment allows a remote operator to recognize the presence or absence of a fault in the image system. The operator stops operating the work vehicle 100 in a case of recognizing a fault in the image system, and can stand by until the fault is rectified.

Comparative Example

Herein, the work vehicle 100, in which the imaging device 122 does not image the mode lamp 126 and the control device 125 combines an animated image that changes in a fixed cycle with an image captured by the imaging device 122, is considered as a comparative example. In the work vehicle 100 according to the comparative example, an animated image displayed on the display device 520 changes in a fixed cycle when the image system is normal. On the other hand, in a case where a fault occurs in the control device 125, the control device 540, or the display device 520 of the image system, the animated image stops. Therefore, an operator can recognize that a fault has occurred. However, in a case where a fault occurs in the imaging device 122 and the imaging device 122 continues to output the same image, the control device 125 combines the animated image with the same image. Therefore, the animated image displayed on the display device 520 changes in a fixed cycle regardless of the occurrence of the fault in the image system. For this reason, the operator cannot recognize the occurrence of the fault.

On the contrary, according to the first embodiment, since a change in the mode lamp 126 stops even when a fault occurs in any unit of the image system in the work vehicle 100, the operator can reliably recognize the presence or absence of a fault in the image system.

Another Embodiment

Although one embodiment is described in detail with reference to the drawings hereinbefore, a specific configuration is not limited to the description above, and it is possible to make various design modifications or the like.

For example, although the work vehicle 100 includes the mode lamp 126 as a changing object in which a known change in an external appearance occurs for each fixed time in the embodiment described above, the work vehicle is not limited thereto. For example, the work vehicle 100 according to another embodiment may include, as a changing object, another lamp, a blinking lamp, a clock (second hand in particular), and a monitor that displays an image showing a known change for fixed time. In a case of additionally providing the changing objects in the work vehicle 100, it is preferable to provide the changing objects at positions where the field of view is not blocked, such as a pillar. In addition, it is sufficient that a changing object be an object in which a known change in an external appearance occurs at least while an image captured by the imaging device 122 is being transmitted or received. That is, a changing object may be an object in which a change in an external appearance does not occur while an image is not being transmitted or received.

In addition, although the mode lamp 126 according to the embodiment described above is provided in front of the operator cab 121, the mode lamp is not limited thereto. For example, in a case where a changing object is included in an imaging area of the imaging device 122, the mode lamp may be provided inside the operator cab in another embodiment. In another embodiment, the work vehicle 100 may include a mirror, and an image of a changing object, which is reflected in the mirror, may be included in an imaging area of the imaging device 122. In addition, in another embodiment, an image of a changing object, which is reflected in the car body, may be included in an imaging area of the imaging device 122.

In addition, although the control device 540 according to the embodiment described above generates the image P11 to the image P15 by performing cutting-out so as to leave a portion where the mode lamp 126 appears, the control device is not limited thereto. For example, in another embodiment, the control device may generate the image P11 to the image P15 by performing cutting-out so as to not leave a portion where the mode lamp 126 appears, further cut out a region where the mode lamp 126 appears from the image P1, and superimpose the cut out image onto any one of the images P11 to P15 to display the superimposed image.

In addition, although an operator determines the presence or absence of a fault by looking at the mode lamp 126 that appears in the display device 520 in the embodiment described above, determination is not limited thereto. For example, in another embodiment, a computer may determine the presence or absence of a fault by the computer monitoring the amount of a change in brightness of a point of the image P1, in which the mode lamp 126 appears.

Figure 6:
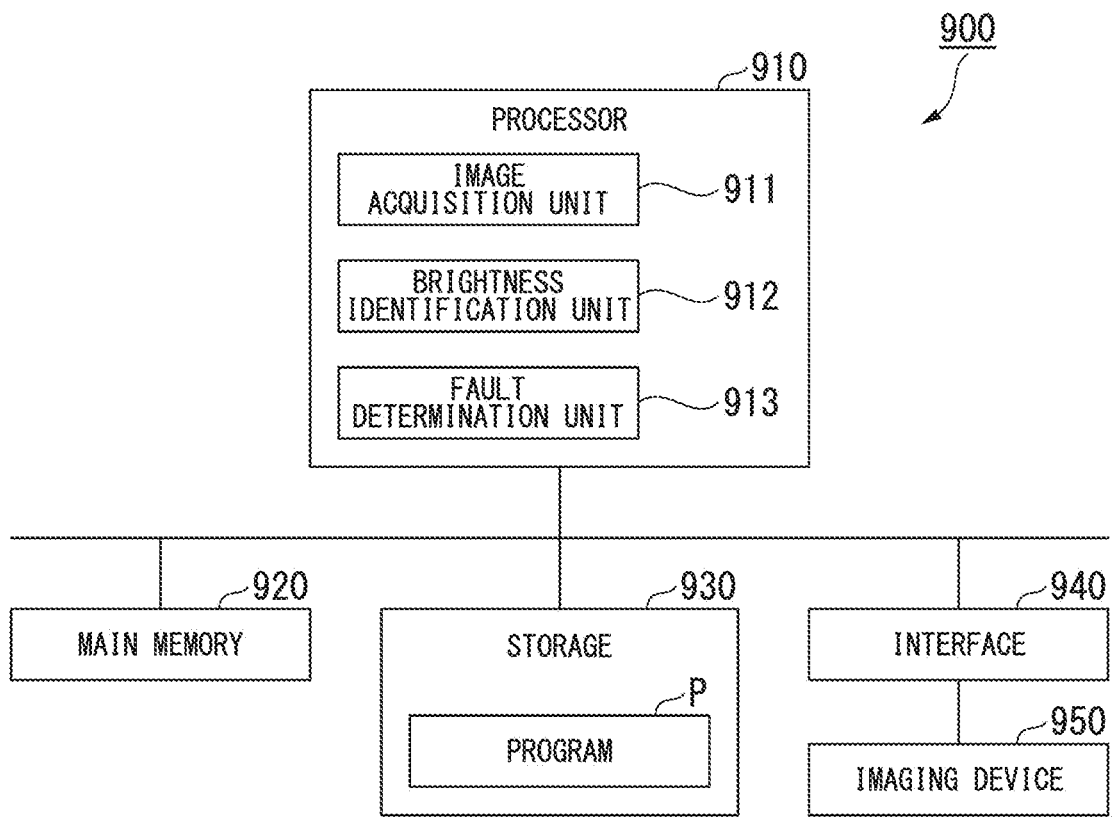
FIG. 6 is a schematic block diagram showing a configuration of a fault determination device according to another embodiment.

FIG. 6 is a schematic block diagram showing a configuration of a fault determination device according to another embodiment.

For example, in the remote operation system 1 according to another embodiment, the remote operation room 500 includes a fault determination device 900 shown in FIG. 6, and the fault determination device 900 may determine the presence or absence of a fault in the image system.

The fault determination device 900 is a computer including a processor 910, a main memory 920, a storage 930, an interface 940, and an imaging device 950. The storage 930 stores a program p. The processor 910 reads the program p from the storage 930 to deploy to the main memory 920, and executes processing in accordance with the program p. The fault determination device 900 is connected to the imaging device 950 via the interface 940.

The imaging device 950 images a point of an image displayed on the display device 520, in which at least the mode lamp 126 appears.

Examples of the storage 930 include a hard disk drive (HDD), a solid-state drive (SSD), a magnetic disk, a magneto-optical disk, a compact disc read-only memory (CD-ROM), a digital versatile disc read-only memory (DVD-ROM), a semiconductor memory, and the like. The storage 930 may be an internal medium directly connected to a common communication line of the fault determination device 900, or may be an external medium connected to the fault determination device 900 via the interface 940. The storage 930 is a non-temporary tangible storage medium.

The processor 910 includes, by execution of the program P, an image acquisition unit 911, a brightness identification unit 912, and a fault determination unit 913.

The image acquisition unit 911 acquires an image from the imaging device 950.

The brightness identification unit 912 identifies the brightness of a point of the acquired image, in which the mode lamp 126 appears.

The fault determination unit 913 determines whether or not there is a fault in the image system by determining whether or not the brightness of the point where the mode lamp 126 appears changes for each fixed time.

The fault determination device 900 determines a fault in the image system through the same processing as the flow chart shown in FIG. 5. That is, the image acquisition unit 911 acquires an image in which the mode lamp 126 appears from the imaging device 950 (Step S1). The brightness identification unit 912 identifies the brightness of a portion of the acquired image, in which the mode lamp 126 is displayed. The fault determination unit 913 determines whether or not the brightness changes for each fixed time (Step S2). In a case where the brightness changes for each fixed time (Step S2: YES), the fault determination unit 913 determines that a fault in the image system has not occurred (Step S3). On the other hand, in a case where the brightness does not change for each fixed time (Step S2: NO), the fault determination unit 913 determines that a fault in the image system has occurred (Step S4).

Accordingly, the fault determination device 900 can determine the presence or absence of a fault in the image system. In another embodiment, the determination may be performed based on an image received by the control device 540. On the other hand, in a case where the control device 540 performs the determination, and in a case where a fault has occurred between the control device 540 and the display device 520, the fault cannot be detected. Therefore, it is preferable to determine a fault based on an image displayed on the display device 520 as in the fault determination device 900.

INDUSTRIAL APPLICABILITY

The work vehicle of the present invention allows a remote operator to recognize the presence or absence of a fault in an image system.

The invention claimed is:

1. A work vehicle, comprising:
   a work equipment;
   a changing object located at the work vehicle and configured to output a known change in an external appearance for each fixed time, the changing object being configured to output the known change (i) while the work vehicle is in operation and (ii) while the work vehicle is not in operation;
   an imaging device configured to image an area where the changing object and at least a part of the work equipment appear; and
   a transmitting device configured to transmit an image captured by the imaging device, the image including both the changing object and at least the part of the work equipment.

2. The work vehicle according to claim 1, further comprising:
   a control device configured to operate the work equipment based on an externally received operation signal.

3. The work vehicle according to claim 2, wherein the changing object is configured to output the change regardless of presence or absence of receipt of the operation signal.

4. The work vehicle according to claim 1, wherein the work vehicle is a shovel,
   wherein the work vehicle further comprises:
      a traveling body, and
      a swing body supported by the traveling body and supporting the work equipment, and
   wherein the work equipment and the changing object are supported by the swing body.

5. The work vehicle according to claim 1, wherein the changing object on which the known change in the external appearance occurs for each fixed time according to an operation state of the work vehicle.

6. The work vehicle according to claim 1, wherein the changing object is a lamp, and
   wherein the lamp has a blinking pattern that is determined in advance according to an operation state of the work vehicle.

7. The work vehicle according to claim 1, wherein the image includes a first region of the working vehicle, an area of the first region being less than an overall area of the working vehicle.

8. The work vehicle according to claim 1, wherein the transmitting device is configured to transmit the image such that the image is split into a plurality of images, the plurality of images including a plurality of regions of the working vehicle and being displayed in a plurality of screens, respectively,
wherein an area of each of the plurality of regions is less than an overall area of the working vehicle, and
wherein one of the plurality of images includes both the changing object and at least the part of the work equipment.

9. A display device configured to display an image captured by an imaging device mounted on a work vehicle including a work equipment, the display device being configured to display the image at least while the image is being transmitted or received regardless of presence or absence of operation of an operation device for remotely operating the work vehicle, and
wherein the image includes both a changing object and at least a part of the work equipment the changing object being located at the work vehicle and configured to output a known change in an external appearance for each fixed time, and
wherein the changing object is configured to output the known change (i) while the work vehicle is in operation and (ii) while the work vehicle is not in operation.

10. The display device according to claim 9, further comprising:
a control device that operates the work equipment based on an externally received operation signal.

11. The display device according to claim 10, wherein the change occurs in the changing object regardless of the presence or absence of receipt of the operation signal.

12. The display device according to claim 9, wherein the work vehicle is a shovel,
wherein the work vehicle further comprises:
a traveling body, and
a swing body supported by the traveling body and supporting the work equipment, and
wherein the work equipment and the changing object are supported by the swing body.

13. The display device according to claim 9, wherein the changing object on which the known change in the external appearance occurs for each fixed time according to an operation state of the work vehicle.

14. The display device according to claim 9, wherein the changing object is a lamp, and
wherein the lamp has a blinking pattern that is determined in advance according to an operation state of the work vehicle.

15. A fault determination method, comprising:
acquiring an image captured by an imaging device from a work vehicle including a changing object configured to output a known change in an external appearance for each fixed time and the imaging device, the imaging device being configured to image an area of the work vehicle where the changing object is located; and
determining whether or not the acquired image changes for each fixed time,
wherein the changing object is configured to output the known change (i) while the work vehicle is in operation and (ii) while the work vehicle is not in operation, and
wherein the image includes both the changing object and at least a part of the work vehicle.

16. The fault determination method according to claim 15, further comprising:
operating a work equipment based on an externally received operation signal.

17. The fault determination method according to claim 16, wherein the change occurs in the changing object regardless of presence or absence of receipt of the operation signal.

18. The fault determination method according to claim 16, wherein the work vehicle is a shovel,
wherein the work vehicle further comprises:
a traveling body, and
a swing body supported by the traveling body and supporting the work equipment, and
wherein the work equipment and the changing object are supported by the swing body.

19. The fault determination method according to claim 15, wherein the changing object on which the known change in the external appearance occurs for each fixed time according to an operation state of the work vehicle.

20. The fault determination method according to claim 15, wherein the changing object is a lamp, and
wherein the lamp has a blinking pattern that is determined in advance according to an operation state of the work vehicle.

* * * * *